United States Patent
Ying et al.

(10) Patent No.: US 9,131,588 B2
(45) Date of Patent: Sep. 8, 2015

(54) DISCHARGE LAMP SYSTEM AND CONTROLLING METHOD OF THE SAME

(75) Inventors: Jian-Ping Ying, Shanghai (CN); Qi Zhang, Shanghai (CN); Wei-Qiang Zhang, Shanghai (CN); Zi-Ying Zhou, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 819 days.

(21) Appl. No.: 13/241,321

(22) Filed: Sep. 23, 2011

(65) Prior Publication Data

US 2013/0020954 A1    Jan. 24, 2013

(30) Foreign Application Priority Data

Jul. 18, 2011 (CN) .......................... 2011 1 0201145

(51) Int. Cl.
*H05B 41/28* (2006.01)
*H05B 41/288* (2006.01)
*H05B 33/08* (2006.01)
*H05B 41/38* (2006.01)

(52) U.S. Cl.
CPC ........ *H05B 41/2886* (2013.01); *H05B 33/0815* (2013.01); *H05B 41/38* (2013.01); *Y02B 20/202* (2013.01)

(58) Field of Classification Search
USPC ....................... 315/247, 291, 209 R, 307, 224
See application file for complete search history.

(56) References Cited

U.S. PATENT DOCUMENTS

| | | | |
|---|---|---|---|
| 2004/0183463 A1* | 9/2004 | Sun et al. | 315/224 |
| 2006/0038513 A1 | 2/2006 | Henry | |
| 2012/0043900 A1* | 2/2012 | Chitta et al. | 315/201 |

FOREIGN PATENT DOCUMENTS

| | | |
|---|---|---|
| CN | 1476284 A | 2/2004 |
| CN | 1895006 A | 1/2007 |
| CN | 101287322 A | 10/2008 |
| CN | 101553071 A | 10/2009 |
| CN | 201869429 U | 6/2011 |
| TW | 296533 | 1/1997 |
| TW | 297209 | 2/1997 |
| TW | 200417291 | 9/2004 |
| TW | 200639613 | 11/2006 |

* cited by examiner

*Primary Examiner* — Tuyet Vo
(74) *Attorney, Agent, or Firm* — CKC & Partners Co., Ltd.

(57) ABSTRACT

A discharge lamp system includes an AC power source, a rectifier, a power factor correction (PFC) circuit, a half-bridge circuit, and a controller. The AC power source provides an AC power. The rectifier converts the AC power into a DC power. The PFC circuit is electrically coupled to the rectifier and is configured for generating an output voltage. The half-bridge circuit is electrically coupled to the PFC circuit and a discharge lamp, and is configured for converting the output voltage into a voltage required by the discharge lamp. The controller is electrically coupled to the PFC circuit and the half-bridge circuit, and includes a timer for counting time, in which the controller controls the output voltage of the PFC circuit in accordance with a time period counted by the timer.

9 Claims, 6 Drawing Sheets

DISCHARGE LAMP SYSTEM AND CONTROLLING METHOD OF THE SAME

RELATED APPLICATIONS

This application claims priority to China Patent Application Serial Number 201110201145.4, filed Jul. 18, 2011, which is herein incorporated by reference.

BACKGROUND

1. Technical Field

The present disclosure relates generally to a discharge lamp system, and more particularly to a discharge lamp system controlled by an output voltage of a power factor correction circuit and a controlling method thereof.

2. Description of Related Art

Conventionally, high intensity discharge (HID) lamps have relatively high efficiency, good color rendering, and a long service life, such that HID lamps are widely used in many applications.

Usually, in an HID lamp, a relatively low voltage of 220 V has to be increased to a relatively high voltage rapidly by a ballast, in order to excite a material in a quartz tube for radiating in arc. The high intensity white arc generated by the HID lamp resembles the sunlight during the day. The HID lamp does not have a filament, and therefore, a situation in which a filament is broken to thereby render a lamp inoperable will not occur. In addition, compared to a typical halogen lamp, the HID lamp not only has a longer service life but also has improved penetration, improved illumination and lower power consumption for saving electrical energy. Therefore, the HID lamp has been widely researched and developed with the aim of replacing conventional light sources.

However, when the HID lamp is ignited, the relatively low voltage of 220 V has to be increased rapidly to the relatively high voltage required by the HID lamp. Therefore, the HID lamp cannot be operated alone. That is, a specific power supply circuit is necessary to enable the HID lamp to be ignited and radiate light stably. The conventional power supply circuit for the HID lamp includes a power factor correction (PFC) circuit and an inverter connected to the PFC circuit, where the inverter can be a full-bridge inverter or a half-bridge inverter. The half-bridge inverter has the advantage of relatively low cost, and is therefore frequently selected for use in the HID lamp. However, the HID lamp has a special characteristic. Namely a maximum voltage (i.e., open circuit voltage, OCV) provided to the HID lamp by the half-bridge circuit is only half of the output voltage of the PFC circuit. For example, if the output voltage of the PFC circuit is 400 V, the OCV of the half-bridge circuit is thus 200 V, while the OCV required to ignite the HID lamp is usually in the range of about 250 V to 350 V. Thus, if the typical output voltage of 400 V for the PFC circuit is used in combination with the half-bridge inverter structure, problems will be encountered with respect to the ignition of the HID lamp.

SUMMARY

One aspect of the present disclosure is to provide a discharge lamp system including an AC power source, a rectifier, a power factor correction (PFC) circuit, and a half-bridge circuit. The AC power source is configured for providing an AC power. The rectifier is configured for converting the AC power into a DC power. The PFC circuit is electrically coupled to the rectifier, for generating an output voltage. The half-bridge circuit is electrically coupled to the PFC circuit and a discharge lamp, for converting the output voltage into a voltage required by the discharge lamp. The controller is electrically coupled to the PFC circuit and the half-bridge circuit and includes a timer for counting time, in which the controller is configured for controlling the output voltage of the PFC circuit in accordance with a time period counted by the timer.

According to one embodiment of the present disclosure, the controller includes a controlling unit, a first driver and a PFC controller. The controlling unit includes the timer. The first driver is configured for generating a first driving signal. The PFC controller is electrically coupled to the controlling unit and the first driver, for controlling the PFC circuit by the first driver in accordance with the time period counted by the timer.

According to one embodiment of the present disclosure, when the time period counted by the timer is less than or equal to a predetermined time, the PFC circuit outputs a first voltage, and when the time period counted by the timer is greater than the predetermined time, the PFC circuit outputs a second voltage, in which the second voltage is less than the first voltage.

According to one embodiment of the present disclosure, the predetermined time is greater than or equal to a required time to ignite the discharge lamp.

According to one embodiment of the present disclosure, the discharge lamp system further includes an igniter activated when the time period counted by the timer is within the predetermined time and deactivated when the time period counted by the timer extends past the predetermined time.

According to one embodiment of the present disclosure, the PFC circuit includes a first switch, and the first driving signal is configured for driving the first switch.

According to one embodiment of the present disclosure, the half-bridge circuit includes a second switch and a third switch.

According to one embodiment of the present disclosure, the controller further includes a second driver. The second driver is electrically coupled to the controlling unit, for generating a second driving signal and a third driving signal, in which the second driving signal and the third driving signal are configured for driving the second switch the third switch, respectively.

According to one embodiment of the present disclosure, the discharge lamp is a high intensity discharge lamp.

According to one embodiment of the present disclosure, the first switch, the second switch, and the third switch are metal oxide semiconductor field effect transistors (MOSFETs).

Another aspect of the present disclosure is to provide a controlling method for a discharge lamp system. The controlling method includes determining whether a time period counted by a timer is greater than a predetermined time. Next, a first voltage is outputted by a PFC circuit when the time period counted by the timer is not greater than the predetermined time, and otherwise, a second voltage is outputted by the PFC circuit, where the second voltage is less than the first voltage.

According to one embodiment of the present disclosure, the predetermined time is greater than or equal to a required time to ignite a discharge lamp.

According to one embodiment of the present disclosure, an igniter is activated when the time period counted by the timer is within the predetermined time and deactivated when the time period counted by the timer extends past the predetermined time.

Yet another aspect of the present disclosure is to provide a controlling method for a discharge lamp system. The controlling method includes determining whether a counted time period is within a time period $T_n$, in which the time period $T_n$ includes a first time period $\Delta t_{n1}$ and a second time period $\Delta t_{n2}$ following the first time period $\Delta t_{n1}$, where n is an arbitrary positive integer from 1 to N, and N is an integer greater than 1. Subsequently, a first predetermined voltage $V_{n1}$ is outputted by a PFC circuit when the counted time period is within the first time period $\Delta t_{n1}$. After that, a second predetermined voltage $V_{n2}$ is outputted by the PFC circuit when the counted time period is within the second time period $\Delta t_{n2}$, where $V_{n2} < V_{n1}$.

According to one embodiment of the present disclosure, the controlling method further includes outputting the second predetermined voltage $V_{n2}$ by the PFC circuit when the counted time period is greater than time $t_{2n}$.

According to one embodiment of the present disclosure, the controlling method further includes outputting a third predetermined voltage $V_3$ by the PFC circuit when the counted time period is less than time $t_0$.

According to one embodiment of the present disclosure, the controlling method further includes activating an igniter when the counted time period is within the first time period $\Delta t_{n1}$. Next, the igniter is deactivated when the counted time period is within the second time period $\Delta t_{n2}$.

According to one embodiment of the present disclosure, the controlling method further includes outputting the first predetermined voltage $V_{i1}$ by the PFC circuit when the counted time period is within the first time period $\Delta t_{i1}$ of the time period $T_i$. Next, the first predetermined voltage $V_{j1}$ is outputted by the PFC circuit when the counted time period is within the first time period $\Delta t_{j1}$ of the time period $T_j$, where $V_{i1} \neq V_{j1}$, i and j are integers from 1 to N, and $i \neq j$. According to one embodiment of the present disclosure, $V_{i1}$ can be equal to $V_{j1}$.

According to one embodiment of the present disclosure, the controlling method further includes outputting the second predetermined voltage $V_{i2}$ by the PFC circuit when the counted time period is within the second time period $\Delta t_{i2}$ of the time period $T_i$. Next, the second predetermined voltage $V_{j2}$ is outputted by the PFC circuit when the counted time period is within the second time period $\Delta t_{j2}$ of the time period $T_j$, where $V_{i2} \neq V_{j2}$, i and j are integers from 1 to N, and $i \neq j$. According to one embodiment of the present disclosure, $V_{i2}$ can be equal to $V_{j2}$.

The discharge lamp system and the controlling method thereof of the present disclosure are configured for controlling the output voltage of the PFC circuit rapidly according to the time period counted by the timer, in order to control an open circuit voltage (OCV) of a half-bridge inverter, such that the required voltage to ignite the discharge lamp and to operate the same stably is provided by the half-bridge inverter. Moreover, because a half-bridge topology is selected in the present disclosure, cost savings are realized.

It is to be understood that both the foregoing general description and the following detailed description are by examples, and are intended to provide further explanation of the invention as claimed.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

Figure 1:
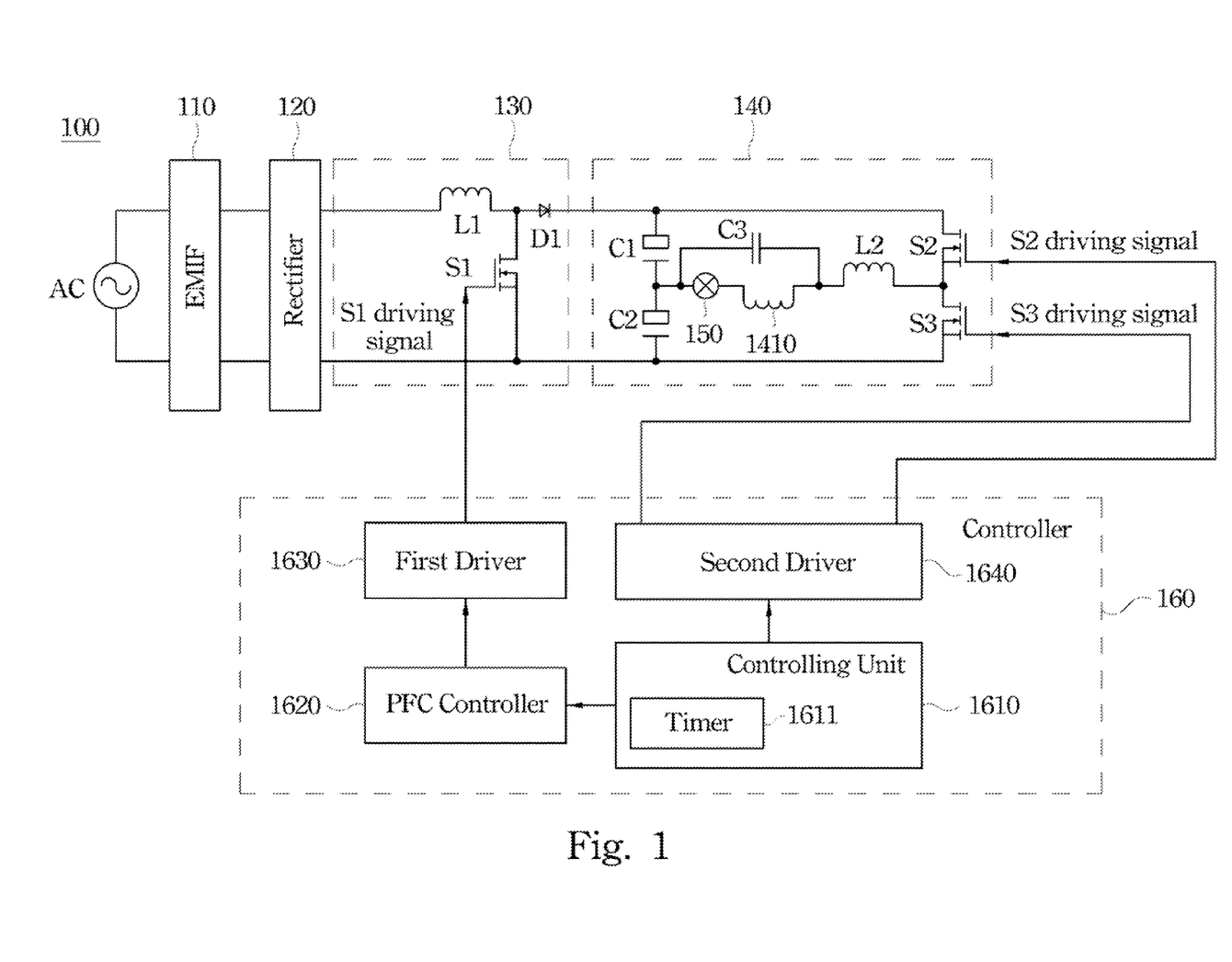
FIG. 1 is a block diagram of a discharge lamp system according to one embodiment of the present disclosure.

Referring to FIG. 1, a block diagram will be described that illustrates a discharge lamp system 100 according to one embodiment of the present disclosure. The discharge lamp system 100 includes a power source AC, an electromagnetic interference filter (EMIF) 110, a rectifier 120, a power factor correction (PFC) circuit 130, a half-bridge circuit 140, a discharge lamp 150 and a controller 160, in which the discharge lamp 150 can be a high intensity discharge (HID) lamp, and the power source AC can be an alternating current power source. One side of the EMIF 110 is connected to the power source AC, for filtering an interference signal to the power source AC. It is noted that the discharge lamp system 100 can be configured without the EMIF 110 and its inclusion within the discharge lamp system 100 as described herein is not intended to limit the present disclosure.

One side of the rectifier 120 is connected to the other side of the EMIF 110. The rectifier 120 is configured for converting the AC power provided by the power source AC into a DC power. The PFC circuit 130 is a boost PFC circuit including an inductor L1, a diode D1, and a first metal oxide semiconductor field effect transistor (MOSFET) S1 (also referred to as a switch S1 herein). The PFC circuit 130 can be configured to perform a boost process to an input voltage of the PFC circuit 130, such that an output voltage V is generated. It is noted that other topologies can be selected for the PFC circuit 130, such as a bulk-boost PFC circuit, and the topology described herein and shown in FIG. 1 is not intended to limit the present disclosure.

The half-bridge circuit 140, which may be, for example, a half-bridge inverter, is connected to the PFC circuit 130, for converting the output voltage V provided by the PFC circuit 130 into a voltage required by the discharge lamp 150. The half-bridge inverter 140 includes an electrolytic capacitor C1, an electrolytic capacitor C2, an igniter 1410, an inductor L2, a capacitor C3, a second MOSFET S2 (also referred to as a switch S2 herein), and a third MOSFET S3 (also referred to as a switch S3 herein). The electrolytic capacitor C1 and the electrolytic capacitor C2 are connected in series with each other. The igniter 1410 is connected in series to the discharge lamp 150. The inductor L2 is connected in series with the discharge lamp 150. The capacitor C3 is connected in parallel with the discharge lamp 150.

The controller 160 can include a controlling unit 1610, a first driver 1630, and a PFC controller 1620. The controlling unit 1610 includes a timer 1611. The first driver 1630 is configured for generating a first driving signal (S1 driving signal). The PFC controller 1620 is connected to the controlling unit 1610 and the first driver 1630, for controlling the PFC circuit 130 through the first driver 1630 in accordance with a time period counted by the timer 1611. Namely, the PFC controller 1620 generates a controlling signal in accordance with the time period counted by the timer 1611, and transmits the controlling signal to the first driver 1630. Thus, the first driver 1630 outputs the first driving signal for driving the switch S1 of the PFC circuit 130, such that the output voltage of the PFC circuit 130 can be controlled. Moreover, the controller 160 further includes a second driver 1640 connected to the controlling unit 1610, and the second driver 1640 is configured for generating a second driving signal (S2 driving signal) and a third driving signal (S3 driving signal) to drive the switches S2 and S3 of the half-bridge inverter 140, respectively.

Figure 2:
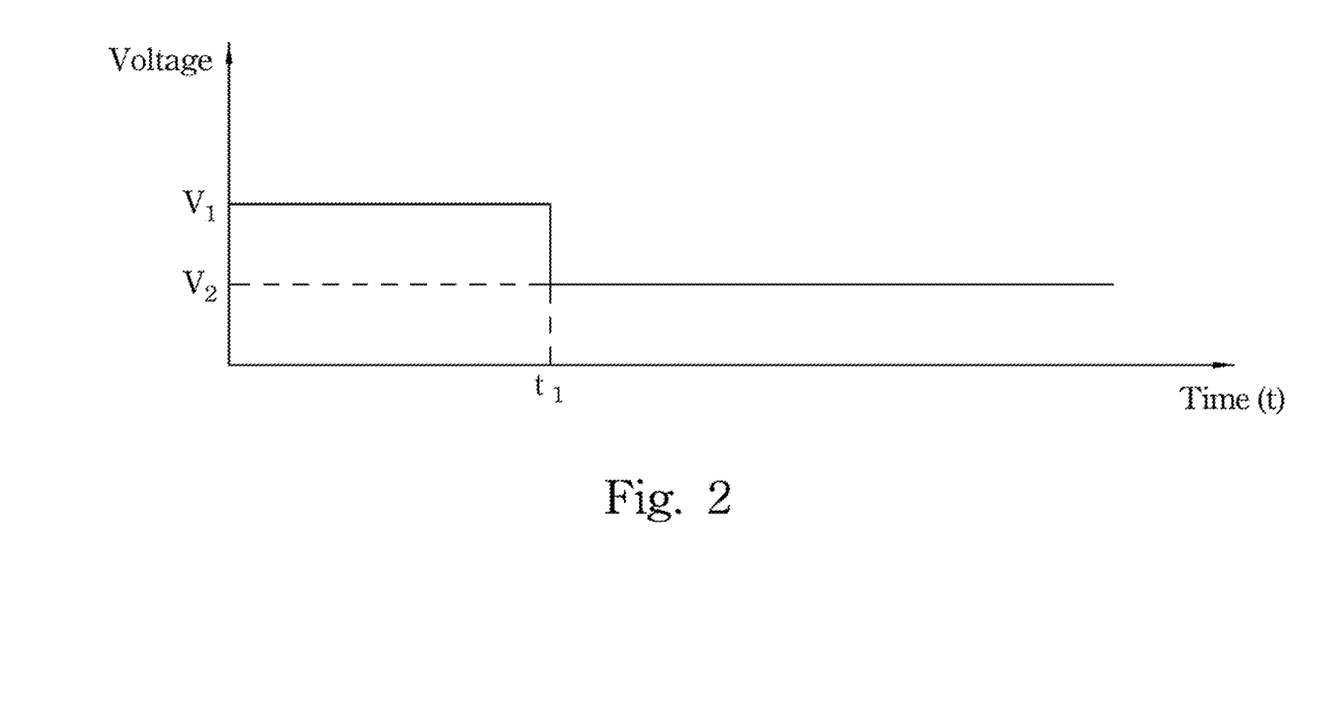
FIG. 2 is a waveform diagram of an output voltage of a PFC circuit of the discharge lamp system according to one embodiment of the present disclosure.

In one embodiment of the present disclosure, at first, a time period is counted by the timer 1611 of the controlling unit 1610. The controlling unit 1610 then instructs the PFC controller 1620 to control the switch S1 through the first driver 1630 in accordance with the time period counted by the timer 1611, such that the output voltage of the PFC circuit 130 can be controlled. When the counted time period is less than or equal to a predetermined time, the PFC circuit 130 outputs a first voltage, and when the counted time period is greater than the predetermined time, the PFC circuit 130 outputs a second voltage. Output voltage waveforms of the first voltage and the second voltage are shown in FIG. 2. FIG. 2 is a waveform diagram of the output voltage of the PFC circuit 130 of the discharge lamp system 100 according to one embodiment of the present disclosure. The time period counted by the timer 1611 is t and the predetermined time is $t_1$. When t is less than or equal to $t_1$, the PFC circuit 130 outputs the first voltage $V_1$, and when t is greater than $t_1$, the PFC circuit 130 outputs the second voltage $V_2$.

It is noted that the predetermined time $t_1$ can be greater than or equal to a required time to ignite the discharge lamp 150. Moreover, when the boost topology is selected for the PFC circuit 130, the first voltage $V_1$ outputted by the PFC circuit 130 is in the range of about 450 V to 550 V. Preferably, the first voltage $V_1$ is 500 V. In addition, the second voltage $V_2$ outputted by the PFC circuit 130 is in the range of about 380 V to 420 V. Preferably, the second voltage $V_2$ is 400 V.

Furthermore, when the bulk-boost topology, is selected for the PFC circuit 130, the first voltage $V_1$ outputted by the PFC circuit 130 is in the range of about 450 V to 550 V. Preferably, the first voltage $V_1$ is 500 V. Additionally, the second voltage $V_2$ outputted by the PFC circuit 130 is in the range of about 100 V to 420 V. Preferably, the second voltage $V_2$ is in the range of about 300 V to 400 V.

Generally speaking, due to an operating characteristic of the discharge lamp, before, the discharge lamp is ignited, a high ignition voltage (usually several kilovolts (kV)) is needed in an igniting process to activate the discharge lamp. Further, a relatively high open circuit voltage (OCV) (usually several hundred volts) is needed to assist the discharge lamp to change from a glow state into an arc state after the discharge lamp is ignited. After the discharge lamp is ignited and is operating stably, it is necessary only that an operating voltage sufficient to maintain a stable operating state of the discharge lamp is supplied.

In the present embodiment, the manner in which the output voltage of the PFC circuit 130 is changed can be selected so as to realize the required voltage in the operation of the discharge lamp 150. The output voltage of the PFC circuit 130 can be increased to raise the open circuit voltage of the half-bridge inverter 140 within a specific time period, and then the output voltage of the PFC 130 circuit can be decreased to lower the open circuit voltage of the half-bridge inverter 140 after the specific time period. An igniting circuit can be operated during a time period, in which the PFC circuit 130 outputs the first voltage (high voltage); therefore the relatively high ignition voltage will be generated. The igniter 1410 can stop the operation during the time period, in which the PFC circuit 130 outputs the second voltage (low voltage); therefore the relatively high ignition voltage will not be generated. Thus, an exhaust of the discharge lamp 150 can be decreased in order to improve the service life of the discharge lamp 150. The PFC circuit 130 outputs the relatively low voltage after the discharge lamp 150 is operated in a stable condition, such that the efficiency of the whole discharge lamp system 100 can be improved.

Figure 3:
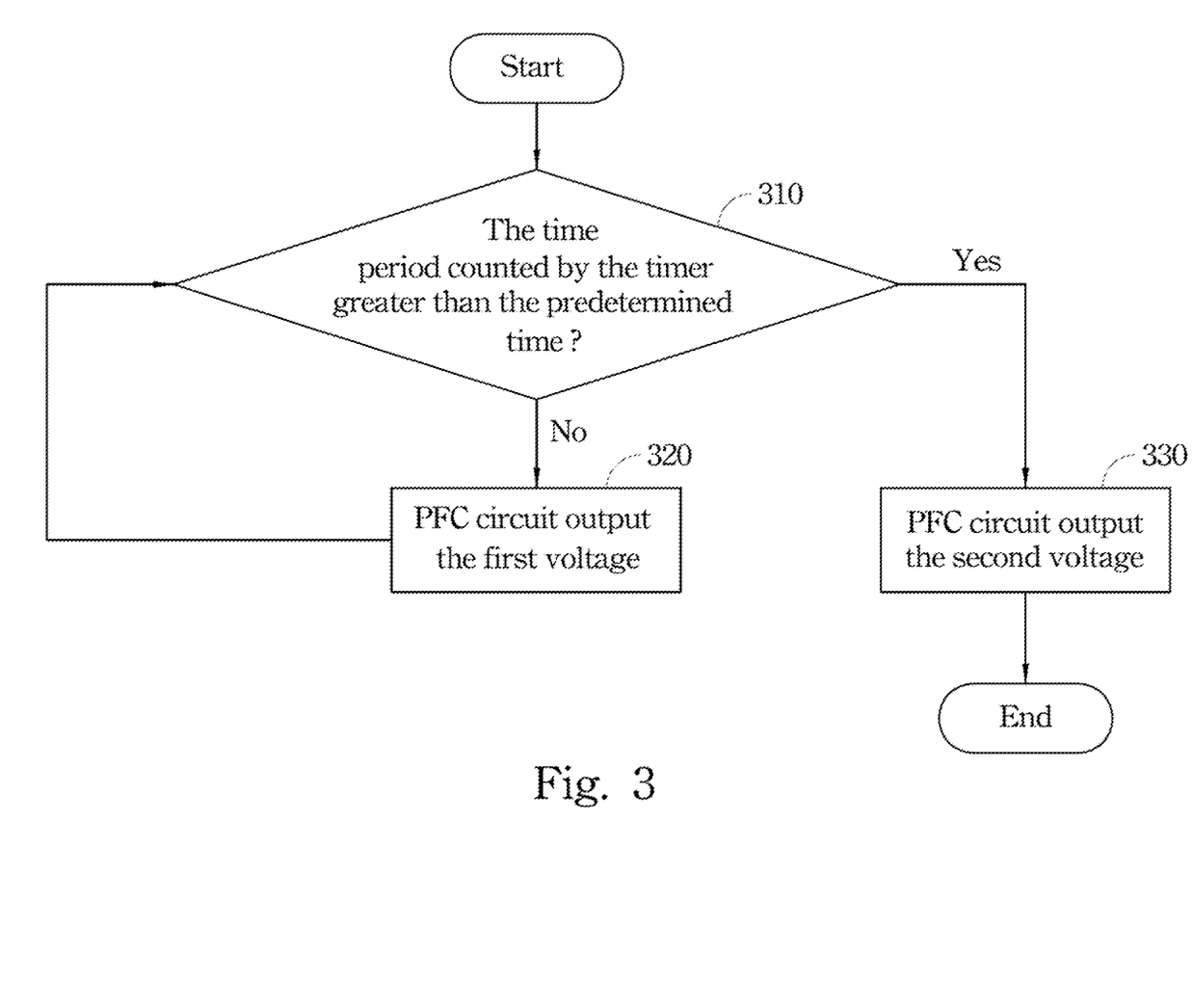
FIG. 3 is a flow diagram of a controlling method for the discharge lamp system in one embodiment of the present disclosure.

Referring to FIG. 3, a flow diagram will be described that illustrates a controlling method for the discharge lamp system 100 in one embodiment of the present disclosure. As shown in FIG. 1, FIG. 2 and FIG. 3, whether the time period counted by the timer 1611 is greater than the predetermined time is determined at operation 310. When the time period counted by the timer 1611 is less than or equal to the predetermined time, operation 320 is performed, where the PFC circuit 130 outputs the first voltage. Otherwise, operation 330 is performed, where the PFC circuit 130 outputs the second voltage. A detailed description of the foregoing operations will be made below.

If we let t be the counted time period of the timer 1611 and $t_1$ be the predetermined time, when t is less than or equal to $t_1$, the PFC circuit 130 outputs the first voltage $V_1$, and when t is greater than $t_1$, the PFC circuit 130 outputs the second voltage $V_2$. In the present embodiment, because the PFC circuit 130 outputs the first voltage $V_1$ with a relatively high voltage level during a time period that is within the predetermined time $t_1$ (i.e., when t is less than or equal to $t_1$), the igniter 1410 is operated normally and the high ignition voltage is outputted by the igniter 1410 to activate the discharge lamp 150. Preferably, the igniter 1410 continuously operates in a normal manner during this time period. When t is greater than $t_1$, the PFC circuit 130 outputs the second voltage $V_2$ with a relatively low voltage level. During this time period, the igniter 1410 stops outputting the high ignition voltage, that is, the igniter 1410 stops operating. Preferably, the igniter 1410 continuously stops working during this time period to thereby decrease the loss of the high ignition voltage for the discharge lamp 150, and as a result, the service life of the discharge lamp 150 is extended. Simultaneously, the PFC circuit 130 outputs the second voltage $V_2$ with the relatively low voltage level; therefore the efficiency of the whole discharge lamp system 100 can be improved.

Figure 4A:
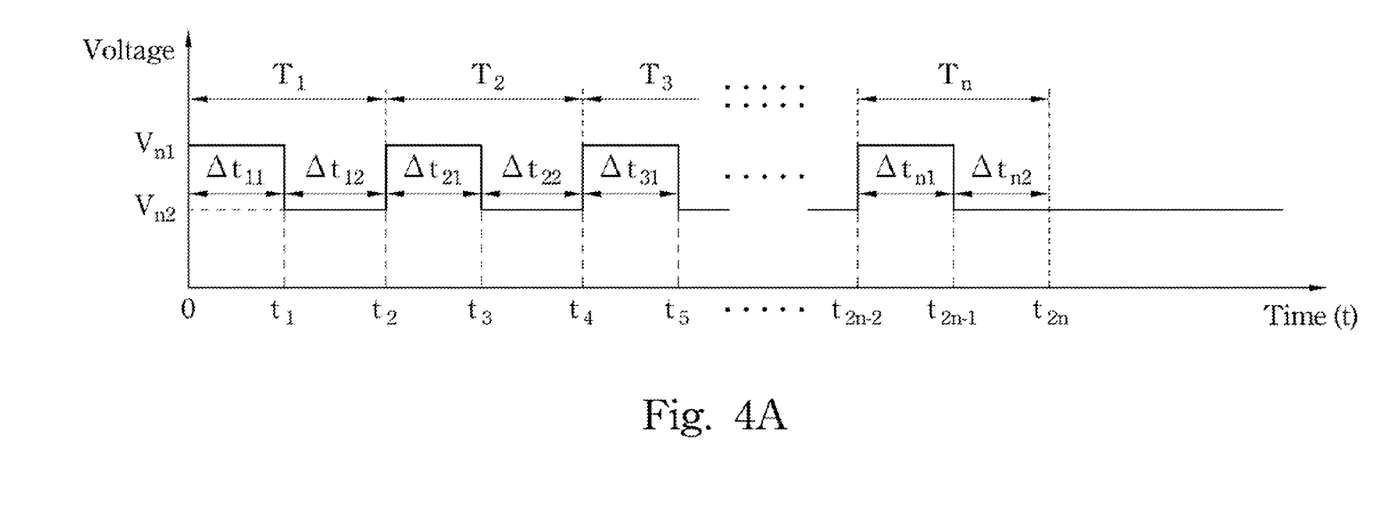
FIG. 4A and FIG. 4B are controlling sequences of the discharge lamp system in one embodiment of the present disclosure.
Figure 4B:
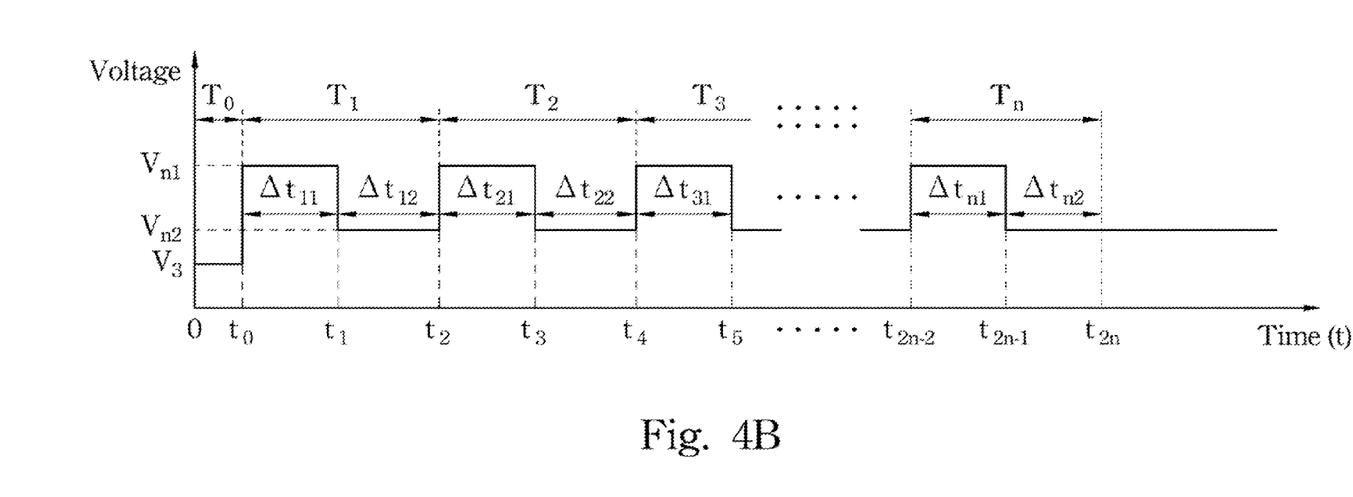

Referring to FIG. 4A and FIG. 4B, controlling sequences will be described that illustrate the discharge lamp system 100 in one embodiment of the present disclosure. As shown in FIG. 1, FIG. 4A, and FIG. 4B, the controlling sequences are used for igniting a hot lamp (or namely the discharge lamp 150), such that the output voltage of the PFC circuit 130 shown in FIG. 1 can be controlled. As shown in FIG. 4A, a time period 0-$t_{2n}$ can be made up of time periods $T_1$, $T_2$, ..., $T_n$, where n is an arbitrary positive integer from 1 to N, and N is an integer greater than 1, in which the time periods $T_1$, $T_2$, ..., $T_n$ can be the same or different. As shown in FIG. 4B, an initial time period $T_0$ can be included before the time period $T_1$; that is, the time period 0-$t_{2n}$ is made up of the time periods $T_0$, $T_1$, ..., $T_n$, in which the time period $T_1$ is made up of $\Delta t_{11}$ and $\Delta t_{12}$ (or represented by the time period from $t_0$ to $t_2$), and the time period $T_2$ is made up of $\Delta t_{21}$ and $\Delta t_{22}$ (or represented by the time period from $t_2$ to $t_4$). Likewise, the time period $T_n$ is made up of $\Delta t_{n1}$ and $\Delta t_{n2}$ (or represented by the time period from $t_{2n-2}$ to $t_{2n}$), in which the time periods $T_0$, $T_1, \ldots, T_n$ can be the same or different.

In this embodiment, the output voltages of the PFC circuit 130 can be the first predetermined voltages $V_{11}, V_{21}, \ldots, V_{n1}$ during the time periods $\Delta t_{11}, \Delta t_{21}, \ldots, \Delta t_{n1}$, respectively, in which the igniter 1410 can operate normally during the foregoing time periods, where the time periods $\Delta t_{11}, \Delta t_{21}, \ldots, \Delta t_{n1}$ can be the same or different. Preferably, the first predetermined voltages $V_{11}, V_{21}, \ldots, V_{n1}$ can be equal, namely the PFC circuit 130 outputs the same output voltage during the time periods $\Delta t_{11}, \Delta t_{21}, \ldots, \Delta t_{n1}$. Preferably, the igniter 1410 can operate normally during the time periods $\Delta t_{11}, \Delta t_{21}, \ldots, \Delta t_{n1}$. The output voltages of the PFC circuit 130 can be the second predetermined voltages $V_{12}, V_{22}, \ldots, V_{n2}$ during the time periods $\Delta t_{12}, \Delta t_{22}, \ldots, \Delta t_{n2}$, respectively, and the second predetermined voltages $V_{12}, V_{22}, \ldots, V_{n2}$ are less than the corresponding first predetermined voltages $V_{11}, V_{21}, \ldots, V_{n1}$, in which the igniter 1410 stops operating during the foregoing time periods, where the time periods $\Delta t_{12}, \Delta t_{22}, \ldots, \Delta t_{n2}$ can be the same or different. Preferably, the second predetermined voltages $V_{12}, V_{22}, \ldots, V_{n2}$ can be equal. Preferably, the output voltages of the PFC circuit 130 are equal during the time periods $\Delta t_{12}, \Delta t_{22}, \ldots, \Delta t_{n2}$. Preferably, the igniter 1410 stops operating during the time periods $\Delta t_{12}, \Delta t_{22}, \ldots, \Delta t_{n2}$.

The controlling sequences for the discharge lamp system 100 in this embodiment provide for several advantages. Usually, a hot lamp needs a super high voltage (about 20 kV) to ignite, and therefore, the controlling sequences can be used to lower the ignition voltage of the discharge lamp 150, and the exhaust of the discharge lamp 150 can be decreased. That is, the igniting process is performed during the time periods $\Delta t_{11}, \Delta t_{21}, \ldots, \Delta t_{n1}$, and when the discharge lamp 150 is unable to be activated, the igniting process can be aborted, after which the output voltage of the PFC circuit 130 is decreased to the second predetermined voltage. After the time periods for cooling down the discharge lamp 150, such as $\Delta t_{12}, \Delta t_{22}, \ldots, \Delta t_{n2}$, re-ignition of the discharge lamp 150 is attempted. Namely, the output voltage of the PFC circuit 130 can be increased to the first predetermined voltage. Hence, the ignition voltage can be set to around 5 kV. Furthermore, after the time periods $T_1, T_2, \ldots, T_n$ of the time period 0-$t_{2n}$ have elapsed, the output voltage of the PFC circuit 130 changes to the second predetermined voltage. In other words, the PFC circuit 130 outputs the corresponding first predetermined voltage $V_{11}$ or $V_{21}$ ... or $V_{n1}$ during the first time period $\Delta t_{11}$ or $\Delta t_{21}$ ... or $\Delta t_{n1}$, during which the igniter 1410 operates normally. The PFC circuit 130 outputs the corresponding second predetermined voltage $V_{12}$ or $V_{22}$ ... or $V_{n2}$ during the second time period $\Delta t_{12}$ or $\Delta t_{22}$ ... or $\Delta t_{n2}$, during which the igniter 1410 stops operating. The PFC circuit 130 outputs a third voltage $V_3$ before the time $t_0$, where the value of the third voltage $V_3$ is not limited to any specific value. After the time periods $T_1, T_2, \ldots, T_n$ of the time period 0-$t_{2n}$ have elapsed, that is, after the time $t_{2n}$, the PFC circuit 130 outputs the second predetermined voltage, and the igniter 1410 stops operating.

It is noted that the voltages $V_{11}, V_{21}, \ldots, V_{n1}$ can be equal or unequal as long as the requirement that the igniter 1410 can operate normally during the time periods $\Delta t_{11}, \Delta t_{21}, \ldots, \Delta t_{n1}$ can be satisfied. Specifically, when the counted time period is within the first time period $\Delta t_{i1}$ of the time period $T_i$, the PFC circuit 130 outputs the first predetermined voltage $V_{i1}$, and when the counted time period is within the first time period $\Delta t_{j1}$ of the time period $T_j$, the PFC circuit 130 outputs the first predetermined voltage $V_{j1}$, where i and j are integers from 1 to N, and i≠j. In the present embodiment, the voltage $V_{i1}$ can be equal to the voltage $V_{j1}$. In the other embodiment of the present disclosure, the voltage $V_{i1}$ can be unequal to the voltage $V_{j1}$; that is, $V_{i1} \neq V_{j1}$.

Similarly, the second predetermined voltages $V_{12}, V_{22}, \ldots, V_{n2}$ can be configured as the same voltage values or different voltage values. Specifically, when the counted time period is within the second time period $\Delta t_{i2}$ of the time period $T_i$, the PFC circuit 130 outputs the second predetermined voltage $V_{i2}$, and when the counted time period is within the second time period $\Delta t_{j2}$ of the time period $T_j$, the PFC circuit 130 outputs the second predetermined voltage $V_{j2}$, where i and j are integers from 1 to N, and i≠j. In the present embodiment, the voltage $V_{i2}$ can be equal to the voltage $V_{j2}$. In the other embodiment of the present disclosure, the voltage $V_{i2}$ can be unequal to the voltage $V_{j2}$, that is $V_{i2} \neq V_{j2}$.

Figure 5:
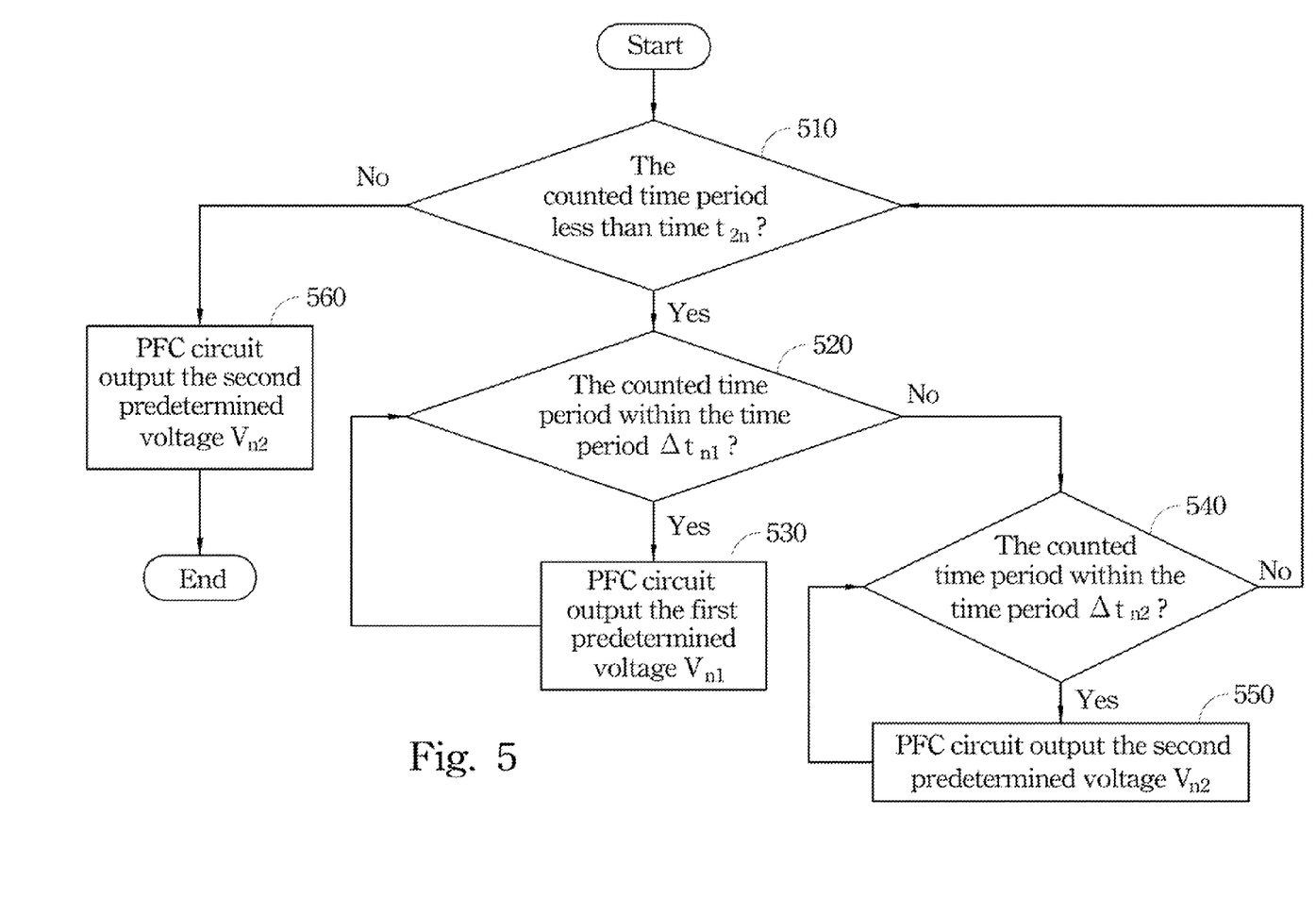
FIG. 5 is a flow diagram of a controlling method for the controlling sequences shown in FIG. 4A.

Referring to FIG. 5, a flow diagram will be described that illustrates a controlling method for the controlling sequences shown in FIG. 4A. As shown in FIG. 1, FIG. 4A, and FIG. 5, whether the counted time period is less than the time $t_{2n}$ is determined at operation 510. When the counted time period is less than the time $t_{2n}$, whether the counted time period is within the time period $\Delta t_{n1}$ is determined at operation 520. If so, operation 530 is performed. If not, operation 540 is performed. At operation 530, the PFC circuit 130 outputs the first predetermined voltage $V_{n1}$. At operation 540, whether the counted time period is within the time period $\Delta t_{n2}$ is determined. If so, operation 550 is performed. If not, the routine returns back to operation 510. At operation 550, the PFC circuit 130 outputs the predetermined voltage $V_{n2}$. If, at operation 510, the counted time period is not less than the time $t_{2n}$, operation 560 is performed, that is, the PFC circuit 130 outputs the second predetermined voltage as an arbitrary voltage value of the $V_{n2}$ described above.

The present disclosure provides a technical solution for the discharge lamp system and the controlling method thereof. That is, the output voltage of the PFC circuit can be controlled by the time period counted by the timer, in order to control the open circuit voltage of the half-bridge inverter. Therefore the required voltage to ignite the discharge lamp and to operate the same stably is provided, and thus a simple and efficient solution is provided. Moreover, because the half-bridge topology is adopted in the technical solution of the present disclosure, cost savings are realized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A controlling method for a discharge lamp system, comprising:
    determining whether a counted time period is within a time period $T_n$ comprising a first time period $\Delta t_{n1}$ and a second time period $\Delta t_{n2}$ following the first time period $\Delta t_{n1}$, wherein n is an arbitrary positive integer from 1 to N, and N is an integer greater than 1;
    outputting a first predetermined voltage $V_{n1}$ by a power factor correction circuit when the counted time period is within the first time period $\Delta t_{n1}$; and
    outputting a second predetermined voltage $V_{n2}$ by the power factor correction circuit when the counted time period is within the second time period $\Delta t_{n2}$, wherein $V_{n2} < V_{n1}$, wherein further comprising:
outputting the first predetermined voltage $V_{i1}$ by the power factor correction circuit when the counted time period is within the first time period $\Delta t_{i1}$ of the time period $T_j$; and
outputting the first predetermined voltage $V_{j1}$ by the power factor correction circuit when the counted time period is within the first time period $\Delta t_{j1}$ of the time period $T_j$;
wherein $V_{i1} \neq V_{j1}$, i and j are integers from 1 to N, and i≠j.

2. The controlling method of claim 1, further comprising:
outputting the second predetermined voltage $V_{n2}$ by the power factor correction circuit when the counted time period is greater than time $t_{2n}$.

3. The controlling method of claim 1, further comprising:
outputting a third predetermined voltage $V_3$ by the power factor correction circuit when the counted time period is less than time $t_0$.

4. The controlling method of claim 1, further comprising:
activating an igniter when the counted time period is within the first time period $\Delta t_{n1}$; and
deactivating the igniter when the counted time period is within the second time period $\Delta t_{n2}$.

5. The controlling method of claim 1, further comprising:
outputting the second predetermined voltage $V_{i2}$ by the power factor correction circuit when the counted time period is within the second time period $\Delta t_{i2}$ of the time period $T_i$; and
outputting the second predetermined voltage $V_{j2}$ by the power factor correction circuit when the counted time period is within the second time period $\Delta t_{j2}$ of the time period $T_j$;
wherein $V_{i2} \neq V_{j2}$, i and j are integers from 1 to N, and i≠j.

6. The controlling method of claim 1, further comprising:
outputting the second predetermined voltage $V_{i2}$ by the power factor correction circuit when the counted time period is within the second time period $\Delta t_{i2}$ of the time period $T_i$; and
outputting the second predetermined voltage $V_{j2}$ by the power factor correction circuit when the counted time period is within the second time period $\Delta t_{j2}$ of the time period $T_j$;
wherein $V_{i2}=V_{j2}$, i and j are integers from 1 to N, and i≠j.

7. A controlling method for a discharge lamp system, comprising:
determining whether a counted time period is within a time period $T_n$ comprising a first time period $\Delta t_{n1}$ and a second time period $\Delta t_{n2}$ following the first time period $\Delta t_{n1}$, wherein n is an arbitrary positive interger from 1 to N, and N is an integer greater than 1;
outputting a first predetermined voltage $V_{n1}$ by a power factor correction circuit when the counted time period is within the first time period $\Delta t_{n1}$; and
outputting a second predetermined voltage $V_{n2}$ by the power factor correction circuit when the counted time period is within the second time period $\Delta t_{n2}$, wherein $V_{n2}<V_{n1}$,
wherein further comprising:
outputting the first predetermined voltage $V_{i1}$ by the power factor correction circuit when the counted time period is within the first time period $\Delta t_{i1}$ of the time period $T_i$; and
outputting the first predetermined voltage $V_{j1}$ by the power factor correction circuit when the counted time period is within the first time period $\Delta t_{j1}$ of the time period $T_j$;
wherein $V_{i1}=V_{j1}$, i and j are integers from 1 to N, and i≠j.

8. The controlling method of claim 7, further comprising:
outputting the second predetermined voltage $V_{i2}$ by the power factor correction circuit when the counted time period is within the second time period $\Delta t_{i2}$ of the time period $T_i$; and
outputting the second predetermined voltage $V_{j2}$ by the power factor correction circuit when the counted time period is within the second time period $\Delta t_{j2}$ of the time period $T_j$;
wherein $V_{i2} \neq V_{j2}$, i and j are integers from 1 N, and i≠j.

9. The controlling method of claim 7, further comprising:
outputting the second predetermined voltage $V_{i2}$ by the power factor correction circuit when the counted time period is within the second time period $\Delta t_{i2}$ of the time period $T_i$; and
outputting the second predetermined voltage $V_{j2}$ by the power factor correction circuit when the counted time period is within the second time period $\Delta t_{j2}$ of the time period $T_j$;
wherein $V_{i2}=V_{j2}$, i and j are integers from 1 to N, and i≠j.

* * * * *